United States Patent [19]

Barry

[11] 4,207,839
[45] Jun. 17, 1980

[54] BIRD FEEDER

[76] Inventor: Bernard R. Barry, Green Mansion Rd., Warrensberg, N.Y. 12885

[21] Appl. No.: 959,136

[22] Filed: Nov. 9, 1978

[51] Int. Cl.² .............................................. A01K 39/01
[52] U.S. Cl. ................................................... 119/51 R
[58] Field of Search ..................... 119/51 R, 52 R, 53, 119/59, 63; D30/14, 15

[56] References Cited

U.S. PATENT DOCUMENTS

| | | | |
|---|---|---|---|
| 2,896,575 | 7/1959 | Scruggs | 119/52 R X |
| 3,730,139 | 5/1973 | Moore | 119/52 R X |
| 3,977,363 | 8/1976 | Fisher, Jr. | 119/52 R |
| 4,102,308 | 7/1978 | Kilham | 119/51 R X |

*Primary Examiner*—Louis G. Mancene
*Assistant Examiner*—Robert P. Swiatek
*Attorney, Agent, or Firm*—Ladas & Parry

[57] ABSTRACT

A bird feeder having an opened topped hemispherical bird feed container suspended below a hemispherical cover which extends laterally beyond the perimeter of the container, the suspension for the container being pivotally mounted closely adjacent the innermost central portion of the hemispherical cover whereby upon tilting of the cover, at least the lowermost portion of the cover will overlap the adjacent portion of the container.

13 Claims, 5 Drawing Figures

BIRD FEEDER

The present invention relates to bird feeders.

Attention is drawn to applicants copending patent (design) application Ser. No. 945,770 filed Sept. 25, 1978 directed to the esthetic aspects of the bird feeder illustrated in the drawings of the present application, which esthetic aspects are disclaimed from the scope of the claims of the present application.

Attention is drawn to U.S. Pat. Nos. 2,866,435, 3,182,635, 3,788,279, 3,948,220, 4,030,451, Des. 144,271, Des. 241,149, and Des. 244,098.

Attention is particularly drawn to U.S. Pat. Nos. 4,030,451 and Des. 244,098, both of which disclose designs of bird feeders in which an open-topped bird feed container is supported below a curved cover extending laterally beyond the lateral extension of the container to protect the container and its contents from the elements and to provide a reduced access to pests. Both constructions are intended for suspension from an overhanging object and are provided with adjustment for the height of the cover above the container. In the case of U.S. Pat. No. 4,030,451, the cover and container are rigidly interconnected by a rod member and the cover is permitted no relative pivotal movement with respect to the rod or the container. With this construction, a squirrel attempting to gain access to the interior of the container is able to climb down onto the upper surface of the cover and by hooking its tail around the support rod, where it projects through the top of the cover, is able to reach over the edge of the cover sufficiently to gain access to the interior of the container. To avoid this problem, the design concerned would require a cover of substantially greater dimensions than is economically and esthetically desirable.

U.S. Pat. No. Des. 244,098 is substantially similar to the construction of U.S. Pat. No. 4,030,451 with the addition of a hook and eye interconnection between the container and the rod to which the cover is attached and which provides for suspension of the bird feeder from an overhanging object. The hook and eye interconnection is provided in this design in order to facilitate easier removal of the container for filling with bird seed and for emptying the old seeds and chaff therefrom which action is not easily achieved in the construction of U.S. Pat. No. 4,030,451. The hook and eye interconnection is disposed closely adjacent a plane containing the periphery of the hemispherical cover, while the hook at the end of the suspension rod, by which the bird feeder is suspended from an overhanging object, is disposed a substantial distance above the highest point of the hemispherical cover. The effect of this is that the pivotal interconnection of the container support and the bird feeder suspension rod is spaced from the bird feeder suspension hook a distance of the order of the diameter of the hemispherical cover with the result that a squirrel or other pest climbing onto the cover and attempting to reach its periphery will apply a tilting moment to the cover which is relatively small and which is insufficient to cause any substantial tilt. Substantial tilt is prevented by the relatively small tilting moment resulting when the pest's weight is applied relative to the righting movement created by the combined effect of the weight of the cover, container and any seed it may hold, the rigid assembly of the bird feeder suspension rod and cover and the substantial height of the point of suspension of the bird feeder from the hook and eye suspension. As a result of this, the construction disclosed in U.S. Pat. No. Des. 244,098 will, like that of U.S. Pat. No. 4,030,451 permit a squirrel, with the use of its tail, to reach over the rim of the cover to gain access to the seed in the container.

It is an object of the present invention to provide a bird feeder, intended for suspension from an overhanging object, which will provide protection from the elements for a seed container while substantially preventing pests, such as squirrels, from gaining access to the interior of the container.

According to the invention there is provided a bird feeder comprising a bird feed container, a cover disposed above and laterally overlapping said container, said cover having a centrally disposed uppermost portion, means connected with said cover, adjacent said centrally disposed uppermost portion, for suspending said container below said centrally disposed uppermost portion of said cover and means facilitating tilting pivotal motion of said cover about mutually perpendicular horizontal axes, which intersect at a point adjacent said centrally disposed uppermost portion, upon the application of a downward face to said cover remote from said central uppermost portion.

According to a preferred aspect of the invention there is provided a bird feeder comprising a bird feeder container having an upwardly extending peripheral wall portion; a hood disposed over said container and having a depending wall portion terminating in a periphery disposed laterally outwardly of the lateral extension of said container, such that upon pivotal movement of said hood about a point closely adjacent the innermost central portion thereof, at least the then lowest portion of said hood wall portion will overlap an adjacent wall portion of said container; a container suspending means connected to said container; a pivotal connection interconnecting said suspending means with the innermost central portion of said hood, said pivotal connection being disposed closely adjacent said innermost central portion of said hood; and a bird feeder attachment means for attaching said bird feeder to an overhanging structure, said attachment means being disposed closely adjacent said pivotal connection and being adapted to permit ready pivotal motion of said hood about a point closely adjacent said innermost central portion of said hood when said bird feeder is suspended from said overhanging structure.

A bird feeder according to the invention will now be described, by way of example, with reference to the accompanying drawings in which.

Figure 1:
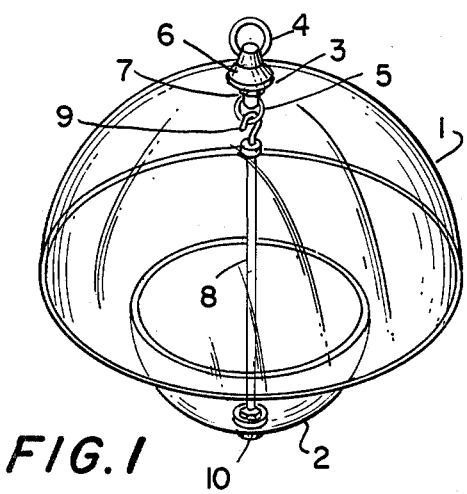
FIG. 1 is a perspective view of the bird feeder.
Figure 2:
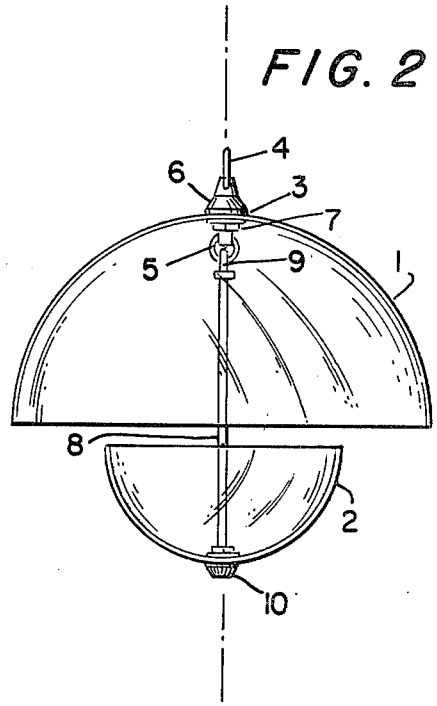
FIG. 2 is a side elevational view thereof.
Figure 3:
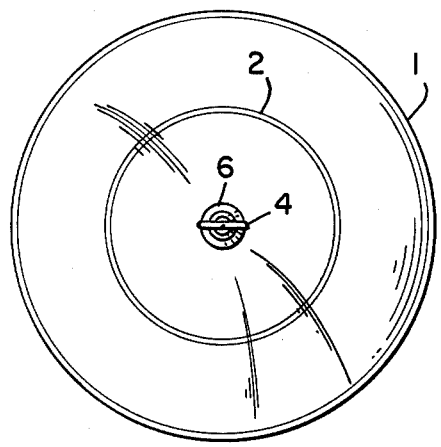
FIG. 3 is a top plan view thereof.
Figure 4:
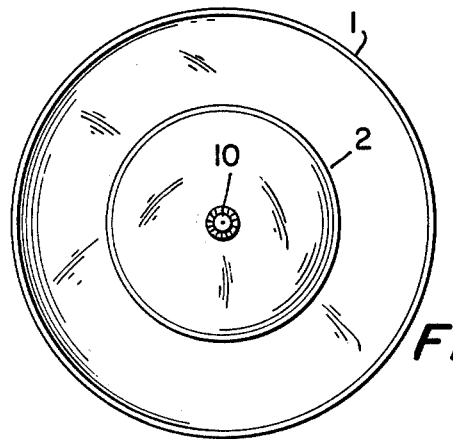
FIG. 4 is a bottom plan view thereof.

With reference to the drawings, a hemispherical cover 1 of 14 inches diameter is disposed centrally above a hemispherical open topped bird feed container 2 of 8 inches diameter, whereby the cover 1 symmetrically overlaps the container 2, as best seen in FIGS. 3 and 4, with a vertical clearance, when viewed in elevation (FIG. 2), between the cover 1 and the container 2 of approximately ½ an inch. The cover and the container are constructed of polycarbonate. The cover 1 and the container 2 are symmetrically disposed about a vertical axis and the cover has a central uppermost portion 3 symmetrically disposed about this axis. Closely adjacent the surface of the cover 1 in the central uppermost portion 3 and on the vertical axis, is a bird feeder suspension ring 4 by means of which the bird feeder may be suspended from an overhanging object. Inside the cover 1, closely adjacent the central uppermost portion 3 and on the vertical axis there is provided a container suspension loop 5. The loops 4 and 5 are rigidly connected together by screw-fitting bases 6 and 7 which screw together through a centrally disposed hole, in the cover 1 on the vertical axis, with the cover 1 rigidly clamped therebetween. The loops 4 and 5 and bases 6 and 7 are dimensioned to minimize the distance between the suspension points of the loop 4 and loop 5 which occur, respectively, on the upper inner periphery of the loop 4 and the lower inner periphery of the loop 5. The distance between these suspension points is less than the radius of the cover 1 and, preferably, less than ½ of the radius of cover 1.

A container suspension rod 8 terminates at its upper end in the hook 9, adapted to engage the loop 5, and, at its other end, in the screw fitting 10 adapted to rigidly attach the container 2 to the rod 8 by use of a central opening, in the counter 2, disposed on the vertical axis. As shown most clearly in FIG. 2, the rod extends along the vertical axis to suspend the container 2 from the suspension surface of the loop 5. The loops 4 and 5, the bases 6 and 7 and the rod 8 with its terminal fittings are constructed of metal chosen or treated to provide resistance to corrosion caused by exposure to the atmosphere.

In use the bird feeder hereinbefore described functions as follows.

The bird feeder is suspended from an overhanging object by means which engages the suspension surface of loop 4 preferably in the form of a metallic hook. The container 2 with bird feed therein, is suspended from loop 5 by means of the hook 9, the components of the bird feeder being symmetrically disposed on the vertical axis. Birds of a type for which the particular dimensions of the bird feeder described are intended can reach the bird feed by flying under the horizontal periphery of the cover 1 to alight on the horizontal periphery of the container 2. Pests, such as squirrels, are denied access to the interior of the container 2 by the substantially free pivotal motion afforded the cover 1 as a result of the minimal distance between the suspension surfaces of the loops 4 and 5. Which, in the case of the embodiment illustrated, is less than ½ of the radius of the cover 1. In this connection, it should be noted that cover 1 will tilt as a result of an application of a weight, for example, that of a squirrel, at a point remote from the central uppermost portion.

When a weight is applied, off center, to the cover, a cover tilting moment equalling the product of the weight and the distance of its point of application from the vertical axis will result. The tilting movement of the cover produces a righting or reaction moment which is the sum of the products of the weights of the cover, container and its contents and the respective displacements of their centers of gravity, from the vertical axis. The vertical axis remains unchanged and is defined by the suspension point of loop 4.

Figure 5:
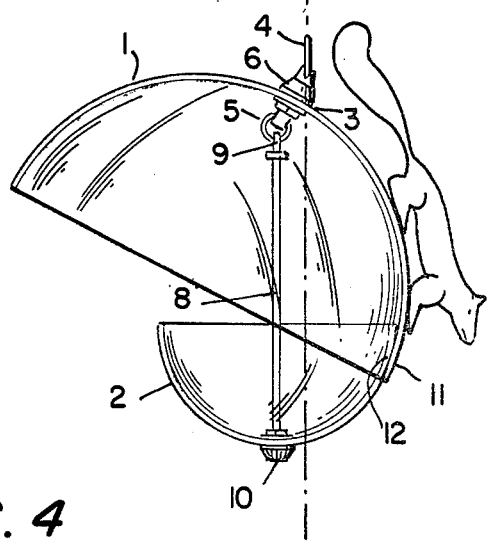
FIG. 5 is a side elevational view with the cover tilted by a squirrel.

The degree of tilt will depend on the extent to which the tilting or overturning moment, created by the weight is counteracted by the reaction or righting moment created by the weight of the cover 1 and suspended container 2 with its contents. When the distance between the suspension surfaces of the loops 4 and 5 is less than the radius of the cover 1, and preferably less than half of the radius of the cover 1, the tilting or overturning moment created by the weight of a squirrel attempting to approach the periphery of the cover 1 will be sufficient to overcome the relatively small righting moment resulting from the relatively small displacement of the centers of gravity of the cover and container with contents from the vertical axis. The cover 1 will tilt far enough to displace the squirrel therefrom or, at least, to cause the lowest portion 11 of the cover 1 when so tilted to overlap the most adjacent portion 12 of the container 2 thereby to eliminate any gap, between the cover 1 and the container 2, through which a squirrel might gain access to the interior of the container 2. This tilting action is best illustrated in FIG. 5.

To provide the greatest efficiency, the loops 4 and 5 are displaced 90 degrees from one another in orientation about the vertical axis and are pivotally mounted in their bases.

The bird feeder of the prior art as represented by U.S. Pat. No. Des. 244,098 discussed above does not provide the easy and sufficient tilt action of the cover of the bird feeder of the present invention because the distance between the suspension surfaces of the bird feeder suspending loop or hook and the bird seed container suspension loop of U.S. Pat. No. Des. 244,098 is substantially in excess of the radius of the hemispherical cover of that design with the result that the righting moment of the prior design upon application of a tilting moment to the cover will be substantial and certainly sufficient to prevent sufficient tilt of the cover to displace a squirrel.

While it is shown and described here in certain specific structure embodying the invention, it will be apparent to those skilled in the art that various modifications of the construction shown may be made without departing from the spirit and scope of the underlying inventive concept and that this concept is not limited to the particular form herein shown and described except insofar as indicated by the scope of the appended claims.

I claim:

1. A bird feeder comprising a bird feed container, a cover disposed above and laterally overlapping said container, said cover having a centrally disposed uppermost portion, means connected with said cover, adjacent said centrally disposed uppermost portion, for suspending said container below said centrally disposed uppermost portion of said cover and means facilitating tilting pivotal motion of said cover about mutually perpendicular horizontal axes, which intersect at a point closely adjacent said centrally disposed uppermost portion, upon the application of a downward force to said cover remote from said central uppermost portion so that said cover overlaps a portion of the container.

2. A bird feeder according to claim 1, wherein said container is of a circular form disposed symmetrically about a vertical axis, said cover is of a circular form with a depending peripheral portion, the cover being disposed symmetrically about said vertical axis with said peripheral portion being disposed laterally outwardly of and above said container, whereby, upon said tilting pivotal motion of said cover, at least the then lowermost portion of said peripheral portion will overlap an outer peripheral portion of said container.

3. A bird feeder according to claim 1, wherein the container is a right open-topped hemisphere, the cover is a right open-bottom hemisphere, the container and the cover defining respective peripheries each lying in a horizontal plane symmetrically about a common vertical axis with the periphery of the cover disposed laterally outwardly of the lateral extension of the periphery of the container and with the plane defined by the periphery of the cover disposed above the plane defined by the periphery of the container.

4. A bird feeder according to claim 3, wherein the means for suspending the container below the cover comprises a rod disposed coaxially with said vertical axis and terminating at its upper end in a pivotable support means and rigidly attached at its lower end to the container symmetrically on the vertical axis, said pivotable support means being adapted to engage in pivotal manner the means for facilitating tilting pivotal motion of said cover.

5. A bird feeder according to claim 4, wherein said means facilitating tilting pivotal motion of said cover comprises a pivotal attachment means disposed inside said cover closely adjacent said central uppermost portion on said vertical axis and adapted for pivotal engagement with the pivotable support means forming the termination at the upper end of said rod and a support means disposed outside said cover closely adjacent said central uppermost portion on said vertical axis for suspending said bird feeder from an overhanging object in a freely pivotable manner.

6. A bird feeder according to claim 5, wherein the distance between the pivotal engagement of the pivotal attachment means and the pivotal suspension of the support means is less than the radius of the hemispherical cover.

7. A bird feeder according to claim 6, wherein said distance is less than ½ of the radius of said hemispherical cover.

8. A bird feeder according to claim 6, wherein the pivotal attachment means and the termination at the upper end of the rod together form a hook and eye adapted for engagement with one another to permit a pivotal motion therebetween about two mutually perpendicular horizontal axes and the support means is a hook member having a suspension surface to provide pivotal suspension of the bird feeder from said overhanging object.

9. A bird feeder according to claim 8, wherein the hook of the support means is closed to form a closed loop.

10. A bird feeder comprising:
a bird feed container having an upwardly extending peripheral wall portion;
a hood disposed over said container and having a depending wall portion terminating in a periphery disposed laterally outwardly of the lateral extension of said container, such that upon pivotal movement of said hood about a point closely adjacent the innermost central portion thereof, at least the lowest portion of said hood wall portion will overlap the adjacent wall portion of said container;
a container suspending means connected to said container;
a pivotal connection interconnecting said suspending means with the innermost central portion of said hood, said pivotal connection being disposed closely adjacent said innermost central portion of said hood; and
a bird feeder attachment means for attaching said bird feeder to an overhanging structure, said attachment means being disposed closely adjacent said pivotal connection and being adapted to permit ready pivotal motion of said hood about said innermost central portion of said hood when said bird feeder is suspended from said overhanging structure.

11. A bird feeder comprising:
a bird feed container;
a circular cover having a depending periphery and disposed in overlapping manner above the container;
a container suspender pivotally mounted to said cover;
a support mounted on said cover for suspending said bird feeder from an overhanging object;
the container, cover, suspender and support all being symmetrically disposed about a common vertical axis, the distance between the pivot point of the suspender and the suspension point of the support being less than the radius of the cover.

12. A bird feeder according to claim 11, wherein the distance is less than ½ the radius of the cover.

13. A bird feeder comprising a bird feed container, a cover disposed above and laterally overlapping said container, said cover having a centrally disposed uppermost portion, means connected with said cover, adjacent said centrally disposed uppermost portion, for suspending said container below said centrally disposed uppermost portion of said cover and means facilitating tilting pivotal motion of said cover about mutually perpendicular horizontal axes, which intersect at a point adjacent said centrally disposed uppermost portion, upon the application of a downward force to said cover remote from said central uppermost portion, the container being a right open-topped hemisphere, the cover being a right open-bottom hemisphere, the container and the cover defining respective peripheries each lying in a horizontal plane symmetrically about a common vertical axis with the periphery of the cover disposed laterally outwardly of the lateral extension of the periphery of the container and with the plane defined by the periphery of the cover disposed above the plane defined by the periphery of the container, the means for suspending the container below the cover comprising a rod disposed coaxially with said vertical axis and terminating at its upper end in a pivotable support means and rigidly attached at its lower end to the container symmetrically on the vertical axis, said pivotable support means being adapted to engage in pivotal manner the means for facilitating tilting pivotal motion of said cover, and said means facilitating tilting pivotal motion of said cover comprising a pivotal attachment means disposed inside said cover closely adjacent said central uppermost portion on said vertical axis and adapted for pivotal engagement with the pivotable support means forming the termination at the upper end of said rod and a support means disposed outside said cover closely adjacent said central uppermost portion on said vertical axis for suspending said bird feeder from an overhanging object in a freely pivotable manner.

* * * * *